US008109382B2

(12) United States Patent  (10) Patent No.: US 8,109,382 B2
Duperray  (45) Date of Patent: Feb. 7, 2012

(54) ARTICLE METERING APPARATUS (75) Inventor: Philippe Duperray, Chateauroux (FR)

(73) Assignee: MeadWestVaco Packaging Systems, LLC, Richmond, VA (US)

( * ) Notice: Subject to any disclaimer, the term of this patent is extended or adjusted under 35 U.S.C. 154(b) by 253 days.

(21) Appl. No.: 12/513,832

(22) PCT Filed: Nov. 6, 2007

(86) PCT No.: PCT/US2007/083834
§ 371 (c)(1),
(2), (4) Date: Dec. 1, 2009

(87) PCT Pub. No.: WO2008/058158
PCT Pub. Date: May 15, 2008

(65) Prior Publication Data
US 2010/0072027 A1  Mar. 25, 2010

(30) Foreign Application Priority Data
Nov. 6, 2006 (GB) .................................. 0622058.6

(51) Int. Cl.
*B65G 47/08* (2006.01)
(52) U.S. Cl. ..................... 198/442; 198/418.7; 198/456; 198/457.01
(58) Field of Classification Search ............. 198/370.07, 198/418.7, 442, 456, 457.01, 457.07, 458, 198/597; 53/252, 443
See application file for complete search history.

(56) References Cited

U.S. PATENT DOCUMENTS

| | | | | |
|---|---|---|---|---|
| 3,333,675 A * | 8/1967 | Lord | ......................... | 198/370.02 |
| 4,147,248 A * | 4/1979 | Kurczak et al. | ............... | 198/358 |
| 4,180,151 A * | 12/1979 | Goertz | .......................... | 198/367 |
| 4,467,487 A | 8/1984 | Hartshorn | | |
| 4,506,779 A | 3/1985 | Seragnoli | | |
| 4,878,337 A * | 11/1989 | Raudat et al. | ................... | 53/534 |
| 5,127,209 A | 7/1992 | Hunter | | |
| 5,161,664 A * | 11/1992 | LeBras | ....................... | 198/419.3 |
| 5,768,854 A * | 6/1998 | Nannini et al. | .................. | 53/252 |
| 5,797,249 A * | 8/1998 | Hartness | ......................... | 53/473 |
| 5,979,147 A * | 11/1999 | Reuteler | ......................... | 53/448 |
| 6,516,937 B1 * | 2/2003 | Deer | ........................ | 198/370.07 |
| 6,772,872 B2 * | 8/2004 | Spangenberg et al. | ........ | 198/442 |
| 6,845,860 B1 * | 1/2005 | Walker | ............................ | 198/433 |
| 6,889,485 B2 * | 5/2005 | Davaillon | ........................ | 53/443 |
| 6,962,250 B2 * | 11/2005 | Van Liempd et al. | ..... | 198/457.06 |
| 7,383,936 B2 * | 6/2008 | Enomoto | .................. | 198/370.02 |
| 7,419,043 B2 * | 9/2008 | Veit | ........................ | 198/370.02 |
| 7,419,047 B2 * | 9/2008 | Cesselli et al. | ................ | 198/597 |
| 7,690,497 B2 * | 4/2010 | Radwallner et al. | ...... | 198/457.03 |
| 7,784,599 B2 * | 8/2010 | Balleza et al. | ................ | 198/432 |
| 7,819,233 B2 * | 10/2010 | Van Schaijk et al. | .... | 198/370.09 |

(Continued)

FOREIGN PATENT DOCUMENTS

GB  1589540 GB  5/1981

(Continued)

*Primary Examiner* — Douglas Hess
(74) *Attorney, Agent, or Firm* — MWV Intellectual Property Group (57) ABSTRACT

A machine for forming a stream of articles into spaced groups of articles, which machine has a working reach and a metering element for being brought into contact with an article passing in a stream, into the working reach, which metering element is driven by a drive means, wherein a speed at which the metering element is driven, is retarded as the metering element enters the working reach without retarding the drive means.

8 Claims, 5 Drawing Sheets

U.S. PATENT DOCUMENTS

| | | | |
|---|---|---|---|
| 7,975,831 B2 * | 7/2011 | Ponti | 198/597 |
| 7,975,832 B2 * | 7/2011 | Balbi | 198/598 |

FOREIGN PATENT DOCUMENTS

| | | |
|---|---|---|
| JP | 62285817 | 11/1987 |
| WO | 2007000397 | 1/2000 |
| WO | 0108978 | 2/2001 |
| WO | 02064464 | 8/2002 |
| WO | 03050020 | 6/2003 |

* cited by examiner

ARTICLE METERING APPARATUS

FIELD OF INVENTION

The present invention relates to apparatus for metering articles into spaced groups. More specifically, though not exclusively, the present invention relates to apparatus that brings a metering element into contact with articles in a stream and accelerates those articles relative to the stream, so as to form a spaced group. Yet more specifically, though not exclusively, the present invention relates to apparatus that retards the speed of the metering element, as it is brought into contact with those articles, so as to limit the forces to which the articles are exposed, before accelerating the metering element to form the spaced group.

BACKGROUND OF THE INVENTION

A common requirement of the packaging industry is the requirement to meter streams of articles into smaller groups of articles, which group may preferably be spaced from one another by desired distances. This metering can, for example, be highly advantageous when each group is to be loaded into a separate container.

A well known method for creating and spacing group of articles is to use a metering apparatus, which apparatus comprises a metering element that is brought into contact with one or more articles in the stream and then accelerates some portion of the articles in the stream to form a group. However, the relative difference in motion between the metering element and the articles in the stream leads to a high impact force being imparted onto the articles at the moment of contact, which may cause damage to the apparatus or the articles themselves.

WO 02/064464 to Davaillon provides a grouping device for articles to be loaded into a carton having spacer elements to engage articles in a stream of articles for separating the stream of articles into discrete groups having two modes of operation.

There is, therefore a requirement for an apparatus that can control the speed of the metering element, relative to that of the articles with which it is to come into contact, so as to reduce the impact forces imparted to those articles. The fact that the packaging industry requires very high rates of throughput and minimal down time further introduces a requirement for the apparatus to be extremely robust and capable of metering articles at high speed.

The present invention seeks to over come or at least mitigate the disadvantages of the prior art, in providing an apparatus directed to the above requirements.

SUMMARY OF THE INVENTION

A first aspect of the present invention provides machine for forming a stream of articles into spaced groups of articles, which machine has a working reach comprises a metering element for being brought into contact with an article passing, in that stream, into the working reach, and further comprises a drive means for driving the metering element, wherein a speed at which the metering element is driven is retarded as the metering element enters the working reach without retarding the drive means.

Preferably, the machine comprises a metering element slidably disposed upon a conveyor means and comprises a portion for making contact with one or more of the articles of the stream, which conveyor means propels the metering element in a first direction at a first speed, and wherein the portion is displaceable relative to the conveyor means such that the contact is made, the displacement of the portion being angled with respect to the first direction such that the portion is caused to have a second speed in the first direction during that displacement, substantially equal to a third speed, which third speed is that possessed by the articles of the stream, when the contact is made, and wherein the first and third speeds are different.

Preferably, the displacement of the portion ceases once the contact is made, at which point the portion returns to the first speed, thereby accelerating the one or more articles from the third speed to the first speed.

Optionally, the machine comprises a shaped cam path that is followed by the portion, and which shaped cam path therefore controls the displacement of that portion.

Preferably, a section of the shaped cam path is angled relative to the direction of the first speed, which angle alters the difference between first speed and the second speed.

Optionally, the displacement takes place in a direction that is at an angle to the direction of the first speed, which angle alters the difference between first and second speeds.

Optionally, each metering element comprises a cam follower element that follows the shaped cam path.

Optionally, the machine comprises more than one metering element.

Optionally, each metering element comprises a comb connected to a carriage.

Optionally, a spacing between any two articles of the stream may be altered as a result of altering the difference between the first and the third speeds.

Optionally, the one or more articles for groups of articles, the sizes of which are alterable by altering the position in which the contact is made, further upstream of the motion of the stream of articles.

A second aspect of the present invention provides a method for forming a stream of articles into spaced groups of articles, which method comprises providing a machine that has a working reach and that comprises a metering element for being brought into contact with an article passing, in the stream, into that working reach, driving that metering element using a drive means, and retarding a speed at which the metering element is driven, without retarding the drive means, at the point in which the metering element enters the working reach.

Preferably, the metering element is slidably disposed upon a conveyor means and comprises a portion for making contact with one or more of the articles of the stream, which conveyor means propels the metering element in a first direction at a first speed, and wherein the said portion is displaceable relative to the conveyor means such that the contact is made, the displacement of the portion being angled with respect to the first direction such that the portion is caused to have a second speed in the first direction during that displacement, substantially equal to a third speed, which third speed is that possessed by the articles of the stream, when the contact is made, and wherein the first and third speeds are different.

BRIEF DESCRIPTION OF THE FIGURES

Exemplary embodiments of the present invention will now be described by way of example only, with reference to the following figures, in which.

DETAILED DESCRIPTION OF THE INVENTION

Figures 1, 2:
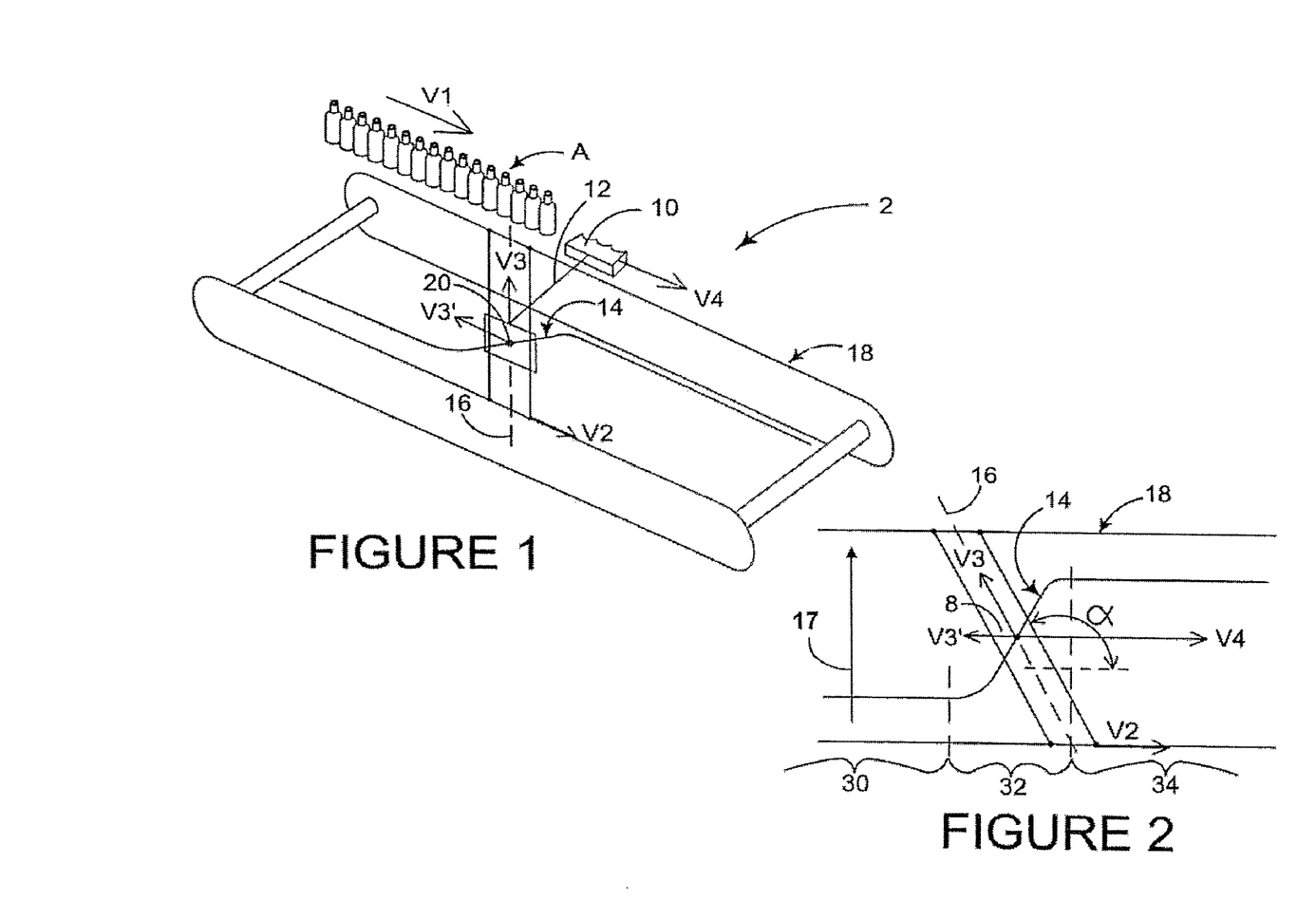
FIG. 1 illustrates a machine for metering articles, according to one aspect of the present invention.
FIG. 2 illustrates a portion of the machine of FIG. 1, in plan view.

The present invention provides a system for grouping and spacing articles A that are conveyed through the working reach of the system in a stream from an in-feed end, as best illustrated in FIG. 1. The stream of articles A pass parallel to a conveyor means of the machine, upon which are mounted metering elements, which metering elements are displaced toward and brought into contact with one or more of the articles A in the stream, thereby to select those articles A. The selected articles are then accelerated relative to the remainder of the stream of articles A so as to form a spaced group.

The system 2 of FIGS. 1 and 2 comprises a plurality of metering elements in the exemplary form of combs 10, connected to respective carriages 8, via connecting portions 12. Each carriage 8 is disposed upon a conveyor means 18, adjacent and parallel to which passes a stream of articles A travelling at a velocity of V1. In the illustrated embodiment, the conveyor means 18 is a conveyor belt, and is driven by some mechanical provision, such as a motor, as is well known in the art. This exemplary conveyor means 18 rotates to propel the carriages 8 along its longitudinal axis, at a velocity V2 that is greater than, and substantially parallel to, the velocity V1 of the articles A.

Each carriage 8 is mounted upon the conveyor means 18 in a slidable manner, such that it may be reciprocally displaced along a line of displacement 16, relative to the conveyor means 18, whilst maintaining a mechanical connection thereto. The specific embodiment of the slidable connection is not essential to the present invention and it is contemplated that one skilled in the art would readily apply one of numerous techniques known in the art to accomplish such functionality. However, in the example shown, the carriage 8 slides between a pair of guide rails (not illustrated). The line of displacement 16 and arrangement of the carriages 8, connection portions 12, and combs 10 is such that the carriage 8 may slide along that line of displacement 16 so as to bring a corresponding comb 10 into, and out of, contact with one or more articles A in the stream.

The system 2 further comprises a cam arrangement that comprises a shaped cam path 14, which cam arrangement is fixed in position and does not move with the rotation of the conveyor means 18. Each carriage 8 comprises some form of cam follower means 20, various implementations of which are readily understood by those skilled in the art. Through interaction between the cam follower 20 and the shaped cam path 14, displacement of the carriage 8 along the line of displacement 16 is effected. The exact embodiments of the shaped cam path 14 and the cam follower 20 are not essential features of the present invention and it is contemplated that one skilled in the art would readily employ one of numerous solutions known in the art to provide such functionality.

Preferably, the line of displacement 16 is angled with respect to a longitudinal axis of the conveyor means 18. In the exemplary embodiment of FIG. 2, this angle is denoted by α (a best shown in FIG. 2) and is greater than 90°.

The displacement of the carriage 8 along the line of displacement 16 can be thought of as comprising two components: a first component lying in the direction of velocity V2 of the carriage; and a second component lying in a direction 90° thereto, transverse to the conveyor means 18, serving to bring the carriage 8 closer to the stream of articles A. The significance of these two components of the displacement is discussed in detail below.

In the exemplary embodiment, the profile of the shaped cam path 14 extends along the length of the conveyor means 18 substantially parallel to the longitudinal axis thereof; a first portion 30 being offset further from the stream of articles, and a second portion 34 being offset closer to the stream of articles. The junction between the first and the second portions of the shaped cam path 14 follows an 'S-bend' in transition region 32 that extends from a terminus of the first portion 30 to a terminus of the second portion 34. A substantial portion of the 'S-bend' in transition region 32 is substantially straight and inclined between the two aforementioned termini. As the carriage 8 is propelled at velocity V2, by the conveyor means 18, so the cam follower 20 of that carriage 8 follows the profile of the shaped cam path 14. As that shaped cam path 14 causes the cam follower 20 to move toward to stream of articles A, so the carriage 8 is caused to slide along the line of displacement 16.

If the line of displacement 16 were to lay parallel to a transverse axis 17 of the conveyor means 18, then the displacement of the carriages 8 would serve only to bring the carriage 8, and therefore the comb 10, closer to the stream of articles A. However, the angle between the line of displacement 16 and the transverse axis 17 of the conveyor means 18 causes a component of that displacement to lay in the direction of motion of the conveyor means 18. That component of the displacement relates to an additional velocity component V3' of the carriage 8 that is additive to V2.

The additional velocity component V3' thus serves to speed up or slow down the motion of the carriage 8 relative to that of the conveyor means 18 and, more importantly, relative to the velocity V1 of the stream of articles A.

The angle α between the line of displacement 16 and the direction of the velocity V2 of the conveying means 18 dictates the nature of the additional velocity component V3:

If the angle is less than 90°, then the additional velocity component V3' will be positive with respect to V2.

If the angle is exactly 90°, then the additional velocity component V3' will be zero.

If the angle is greater than 90°, then the additional velocity component V3' will be negative with respect to V2.

The present invention takes advantage of this relationship to decrease the difference between the velocity V4 of the combs 10 and velocity V1 of the stream of articles A, at a point at which they are brought into contact. The fact that the difference in these two velocities is minimized means that the forces to which the articles A are subjected at that point of contact are also minimised. Thus the articles A are less likely to become damaged and the overall process can be run at a higher throughput rates. This invention is particularly advantageous in that this result is achieved without any requirement for controllably slowing the conveyor means 18, and thus provides a mechanically simple and robust system.

In contrast, metering systems of the prior art often subject the articles A to high impulse forces as metering elements are brought into contact with them, and therefore suffer from frequent breakages of both the articles A and the metering elements themselves.

The profile of the shaped cam path 14 is specifically adapted such that, at the point that the combs 10 are brought into contact with the articles A that form the next group, the corresponding cam follower 20 reaches the end of the 'S-bend' portion 32 of the shaped cam path 14 and begins to follow the second portion 34 thereof. Thus the carriage 8 ceases to move along the line of displacement 16, and thereby ceases to exhibit any additional velocity component V3. Both the comb 10 and the carriage 8, therefore, are caused to return to a velocity V2 equal to that of the conveyor means 18, which velocity is greater than velocity V1 of the stream of articles A, and therefore results in an acceleration of the selected articles A to form a spaced group.

Example 1

Figure 3:
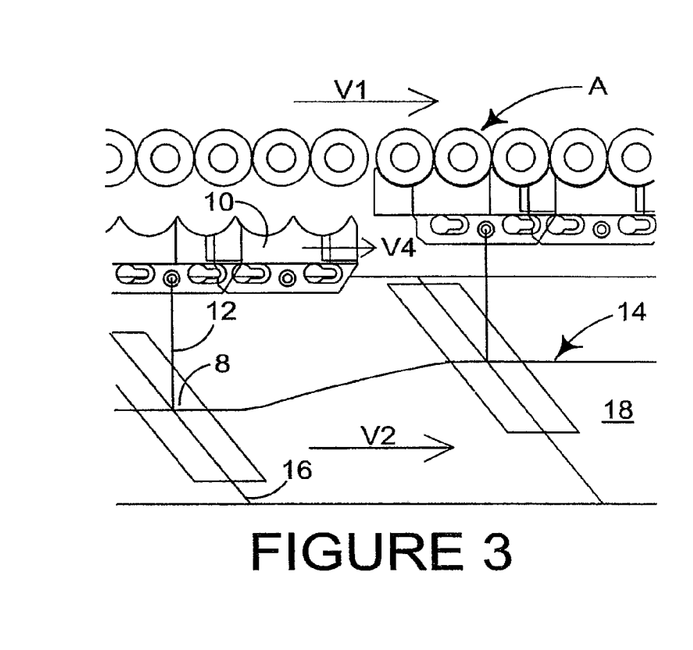
FIGS. 3 to 6 sequentially illustrate the operation of an exemplary embodiment of a machine for metering articles, according to one aspect of the present invention.
Figure 4:
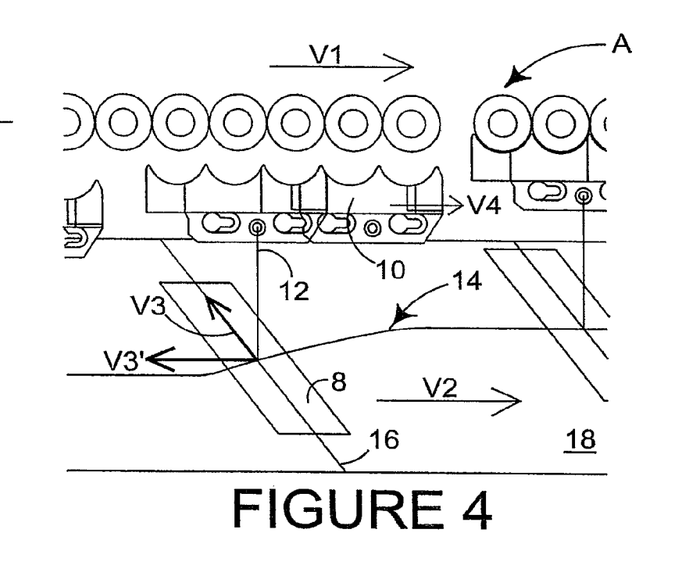
Figures 5, 6:
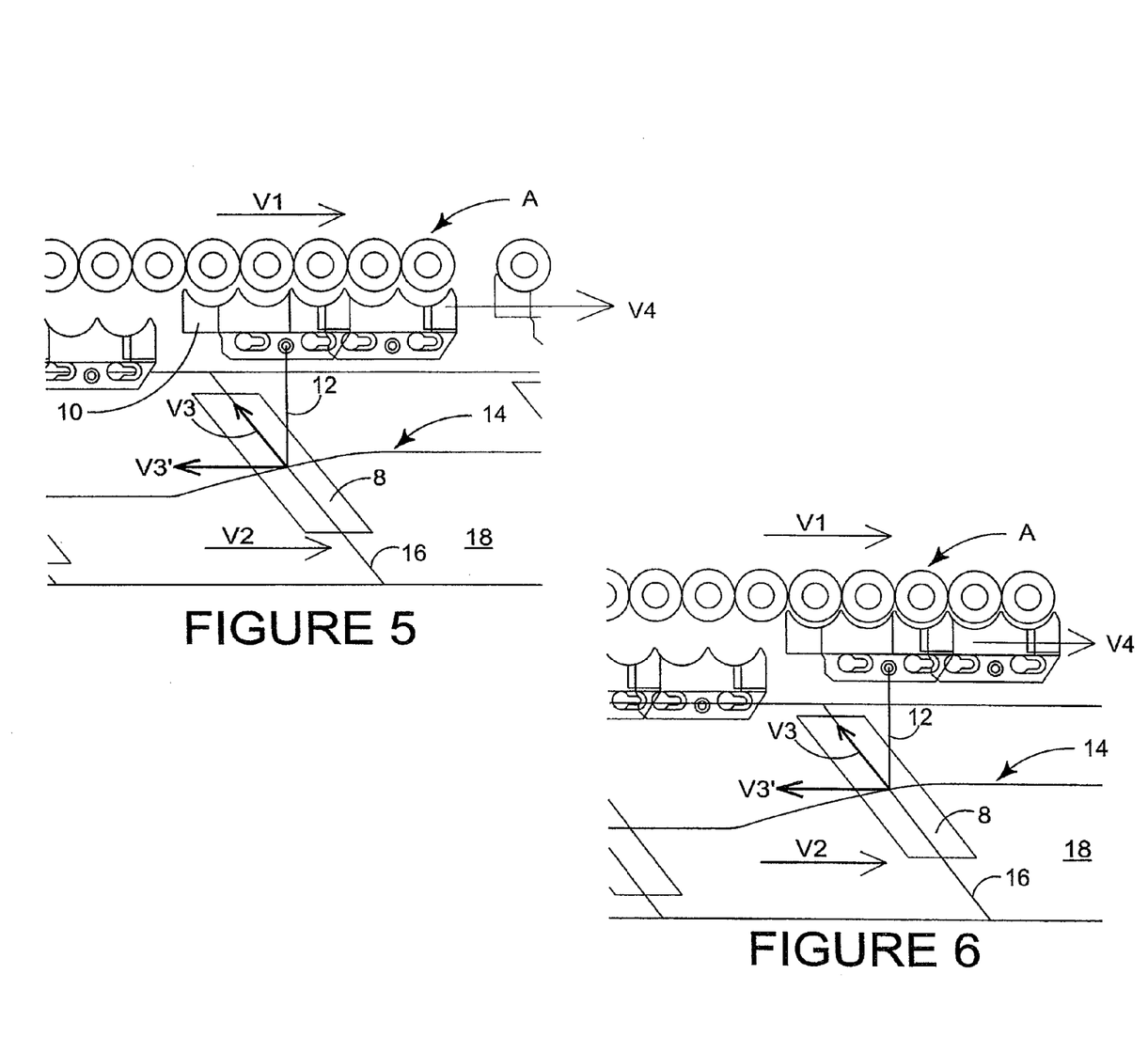

FIGS. 3 to 6 illustrate one embodiment of the present invention, whereby the 'S-bend' in transition region 32, of the shaped cam path 14, follows a relatively straight line that is at an angle to the direction of motion of the conveyor means 18. The figures sequentially illustrate the carriage 8, initially moving with a first velocity V4 equal to the velocity V2 of the conveyor means 18. As the 'S-bend' portion 32 of the shaped cam path 14 exerts a normal reaction force on the cam follower 20, the carriage 8 is forced along the line of displacement 16, thereby giving the comb 10 a total velocity that is equal to the sum of V2 and V3, as is best illustrated in FIGS. 4 and 5. Also illustrated in those figures is velocity component V3', which corresponds to the component of velocity V3 that lays in the same direction as V2. Velocity V4 is the component of the total velocity of the comb 10 that lies in the same direction as velocity V1 of the articles A and is equal to the sum of V3' and V2, wherein V3' is relatively small compared to V2 and is negative. At the point at which the comb 10 is brought into contact with articles A, the velocity V4 of the tools 10 is substantially equal to the velocity V1 of the articles A. In this embodiment, the system 2 is adapted such that each comb 10 is brought into contact with four articles A, and accelerates them as the cam follower 20 moves along the second portion 34 of the shaped cam path 14 at velocity V2, to create a spacing between those articles A and the following group.

Example 2

Figure 7:
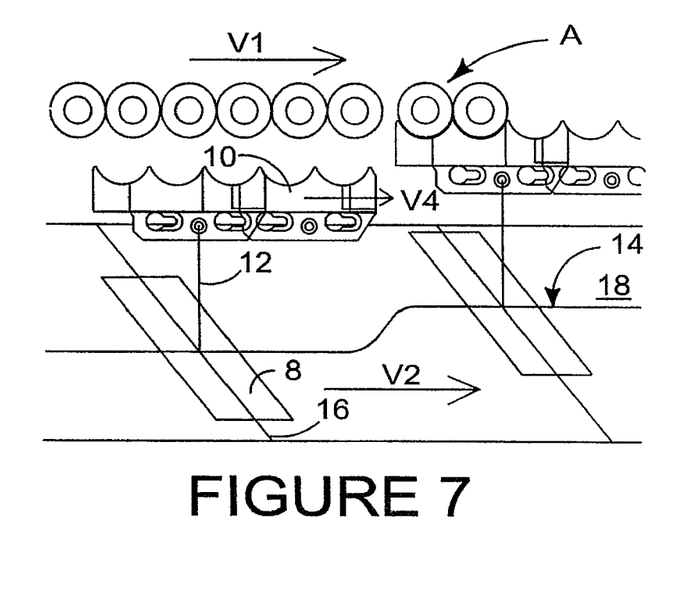
FIGS. 7 to 10 sequentially illustrate the operation of another exemplary embodiment of a machine for metering articles, according to another aspect of the present invention.
Figure 8:
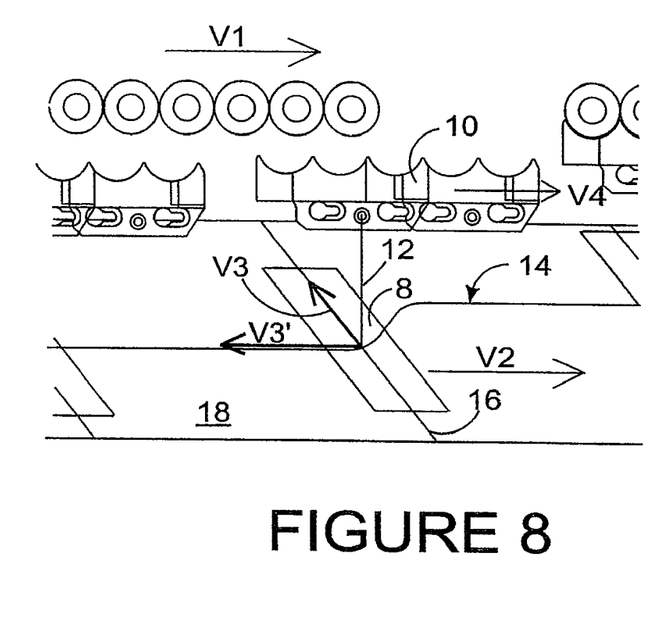
Figure 9:
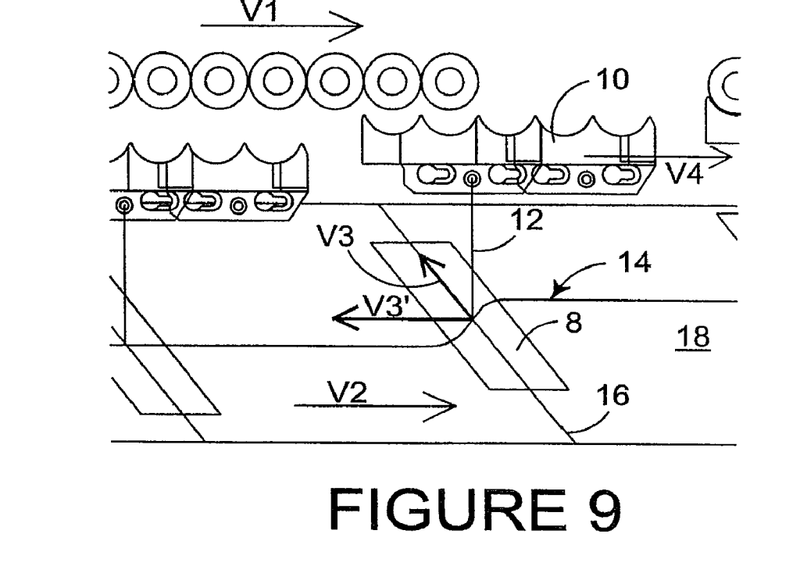
Figure 10:
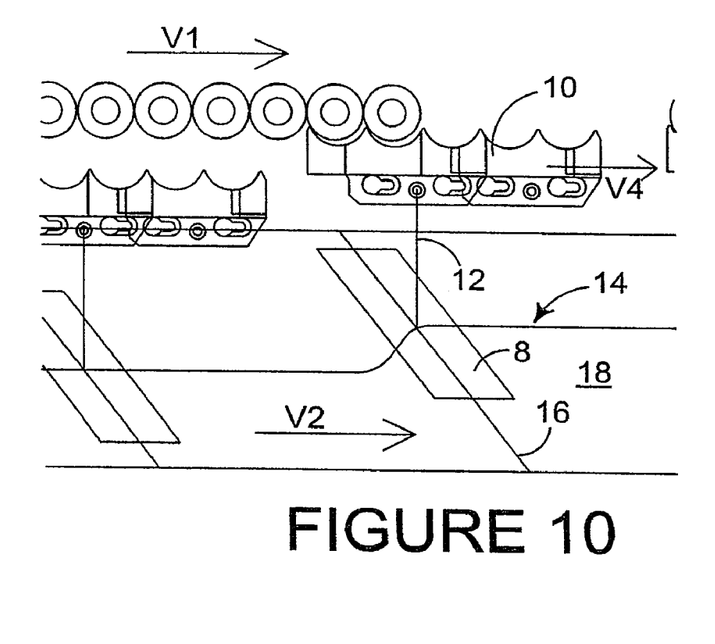

FIGS. 7 to 10 illustrate another embodiment of the present invention, wherein the 'S-bend' portion in transition region 32 of the shaped cam path 14 is inclined at a greater angle to velocity V2 than is the case in the embodiment described in the previous Example 1, and as a result, brings the combs 10 into contact with articles A in a shorter space of time. FIG. 7 illustrates the carriage 8 moving at a velocity of V2, which velocity is greater than that V1 of the stream of articles A. As the cam follower 20 of the carriage 8 reaches the inclined portion of the 'S-bend' 32 of the shaped cam path 14, FIG. 8 shows the carriage 8 beginning to slide along the line of displacement 16. By the point illustrated in FIG. 9 the carriage 8 and therefore comb 10 are moving with a speed in the direction of V2 that is little greater than V1. This is because, in contrast to the embodiment of the previous Example 1, the shaped cam path 14 and line of displacement 16 in FIG. 5 cause a velocity component V3' that is a substantial fraction of V2, and therefore reduces the velocity V4 of the comb 10 by a greater amount. Thus, The comb 10 is brought into contact with articles A of the stream of articles A, with a velocity V4 substantially equal to V1, and at this point the cam follower 20 begins to move along the second portion 34 of the shaped cam path 14, thus reducing V3' to zero, and accelerating the comb 10, and the selected articles A, to velocity V2.

Once the desired grouping and spacing has been desired, one skilled in the art would readily understand that the comb 10 may be disengaged from the articles A by displacement, along the line of displacement 16, away from those articles A.

It will further be appreciated that the carriages 8 may follow some form of return path, such as the underside of the conveyor belt used as the conveyor means 18 in the Figures, or some other means known in the art, so as to be used for further grouping operations.

Furthermore it will be appreciated that the shaped cam path 14 in Example 2 comprises round corners between the included portion of the 'S bend' 32 and the shaped cam path in 14 regions 30 and 34 respectively. The rounded corners provide a smooth transition for the cam follower 20 to follow as it changes direction. This is especially important in the region where the cam follower 20 moves though the transition between the 'S bend' 32 and second portion 34, thereby smoothing effects of the greater velocity change experienced by the tools 10 in Example 2.

The change of velocity experienced by the carriage 8 in Example 2 is significantly greater than that of Example 1 due to the reduction of the angle between the line of displacement 16 and the inclined portion of 'S bend' 32. The combs 10 therefore experience greater deceleration and acceleration in Example 2 than in Example 1. The provision of the rounded corners provides a smoothing of the transition by gradually reducing or increasing the velocity of the combs 10.

The embodiments of the system 2 that have been described above are exemplary in nature, and it is contemplated that the implementation of the various features described above may be altered within the scope of the invention as set out in the attached claims. As noted above, the conveyor means 18, which is illustrated as a conveyor belt, may be any other sort of conveyor means capable of driving the carriages 8 along a path suitable for achieving the grouping operations described above. Additionally, the mechanical implementation of the connection between the carriages 8 and the conveyor means may also be adapted to include any slideable fixing known in the art. The metering elements 10 of the present invention are not limited to combs, and may use any form of metering element that is suitable for selecting and accelerating groups of articles A, such as lugs or overhead plungers. The exemplary embodiments have been illustrated in a horizontal plane, though it is contemplated that the same technique could be used to bring metering elements 10 into contact with the articles A in some other orientation. The two exemplary embodiments typified in FIGS. 3 and 7 show two different shaped cam paths 14 and one angle for the line of displacement, relative to velocity V2, either of which may be altered so as to effect differing relative movement between the conveyor means 18, carriages 8 and articles A.

The invention claimed is:

1. A machine for metering a stream of articles, moving at a first speed in a travel direction, into spaced groups of articles, the machine comprising a metering element operable to intercept said stream of articles and operable to accelerate a selected article relative to the remainder of the stream to thereby form said spaced groups of articles, the machine comprising a drive means for driving the metering element which drive means is operable at a second speed in the travel direction which is greater than the first speed, wherein the speed at which the metering element is moveable is retardable relative to the speed of the drive means before the metering element intercepts said stream of articles, without retarding the speed of the drive means, the metering element being coupled to the drive means by a guide structured such that the metering element is reciprocally displaceable relative to the drive means and characterized in that the guide is disposed at an angle that is greater than 90 degrees relative to the direction of travel of the drive means such that the as the metering element is displaced it is provided with a component of velocity away from the travel direction whereby the speed in the travel direction at which the metering element is moveable is retardable relative to the speed of the drive means.

2. The machine according to claim 1, wherein the guide is configured to cease displacement of said metering element at an angle away from the direction of travel once contact with said selected article is made, whereat the metering element is driven in the travel direction at the speed of the drive means, thereby accelerating said selected article.

3. The machine of claim 1, wherein the machine comprises a shaped cam path and said metering element is coupled to said cam path by a cam follower such that said metering element is caused to follow said shaped cam path.

4. The machine according to claim 3, wherein a section of said shaped cam path is angled relative to the travel direction of the drive means and the rate at which the speed of the metering element is retardable relative to the speed of the drive means is dependent upon the angle of said shaped cam path.

5. The machine of any one of claims 2 to 4, wherein the machine comprises more than one metering element and wherein each metering element comprises a comb connected to a carriage.

6. The machine of any one of claims 2 to 5, wherein a spacing between any two, separately, selected articles of the stream may be altered as a result of altering the difference between said first speed of the article stream and said second speed of the drive means.

7. A method of metering a stream of articles comprising:
(i) moving the incoming article stream at a first speed in a travel direction;
(ii) driving a metering element by a drive means at a second speed in the travel direction;
(iii) retarding the speed of the metering element without retarding the speed of the drive means using a guide, that couples the metering element to the drive means, to reciprocally displace the metering element relative to the drive means at an angle that is greater than 90 degrees relative to the direction of travel of the drive means such that displacing the metering element away from the travel direction imparts a component of velocity away from the travel direction whereby the speed at which the metering element is moveable in the travel direction is retarded relative to the speed of the drive means; and
(iv) intercepting said stream of articles with a metering element when the speed of the metering element in the travel direction is retarded and then accelerating the selected article relative to the remainder of the stream to thereby form said spaced groups of articles.

8. The method of claim 7 wherein the guide is configured such that displacing said metering element at an angle away from the direction of travel ceases once contact with said selected article is made, whereat the metering element is driven in the travel direction at the speed of the drive means, thereby accelerating said selected article.

* * * * *